Patented Dec. 22, 1936

2,065,111

UNITED STATES PATENT OFFICE 2,065,111

PICRIC ACID COMPOUNDS

John C. Bird, Montclair, N. J., assignor to John Wyeth & Brother, Incorporated, Philadelphia, Pa., a corporation of Delaware No Drawing. Application February 28, 1935, Serial No. 8,778

10 Claims. (Cl. 260—143)

This invention relates to improvements in preparations containing compounds of picric acid and particularly the metallic picrates and organic ethers of picric acid. It is a continuation in part of my prior application Serial No. 724,825, filed May 9, 1934.

The compounds of picric acid such as its organic ethers and the metal picrates, more particularly silver picrate, have valuable medicinal and antiseptic properties. However, in the preparation of such compounds for use or for dispensing, for example, in aqueous solution, the low solubility of some of the metal picrates and particularly of silver picrate makes the preparation of materials containing such compounds difficult and expensive, since concentrated solutions cannot be readily prepared or employed. Thus, silver picrate is soluble in water only to the extent of about 1% and to secure even this low solubility, the application of moderate heat is necessary. The compounds of silver, are unstable in aqueous solution, even in the dark, eventually decomposing with the formation of silver oxide, metallic silver and the like, thus losing their medicinal efficiency. Such solutions, which are necessarily dilute, are thus wholly unadapted for pharmaceutical application, storage, or for economical commercial use.

In accordance with this invention, it has been found that silver picrate has a high solubility in the lower monoalkyl ethers of diethylene glycol, and particularly the methyl, ethyl, propyl, and butyl mono-ethers. The solubility of silver picrate is highest in the monoethyl ether, reaching as much as 50%. It is somewhat less in the other lower monoalkyl ethers, being for example, about 25% in the monomethyl ether. In general, the monoethyl ether of diethylene glycol is preferred as the solvent. Furthermore, as these solutions are non-aqueous, the solutions do not readily undergo hydrolysis or decomposition. It is preferable however, that these solutions be not exposed to light for long periods. Solutions in the mono-butyl ether appear to darken especially during manufacture more readily than those in the other solvent ethers.

Such solutions containing in excess of 1% of the picrate, may be readily prepared directly from silver picrate and the monoethyl ether referred to when silver picrate is obtainable. However, the high solubility of silver picrate in the monoalkyl ethers above referred to provides a ready means for the production of the compound directly in the presence of the said monoalkyl ethers, for example, from silver oxide, hydroxide or carbonate and picric acid. For example, such a solution may be readily made as follows:

Silver oxide, which may be procured as such or prepared by precipitation from aqueous solution of silver nitrate by an alkali with subsequent careful washing, in substantially dry form, is thoroughly mixed with a selected solvent monoalkyl ether of diethylene glycol, for example, diethylene glycol monoethyl ether in a suitable container. The container and any mechanical devices that are employed in connection with the manufacture are preferably of non-metallic inert materials such as glass, enamel or the like.

Picric acid is now added to the mixture of the silver oxide and the ether, the proportions being so controlled that there is a slight excess of silver oxide. The mixture is preferably warmed, say to about 90° C. Rapid reaction takes place and silver picrate forms and goes into solution. When the reaction is completed, the solution is neutral or very slightly alkaline to litmus with a faint turbidity due to the slight excess of silver oxide. The solution is then filtered and cooled. While solutions containing a concentration of silver picrate up to 50% may be thus prepared, I prefer to control the proportions of the solvent and of the reagents so that the final solution has a silver picrate concentration of about 20% for convenience in dispensing.

If this solution is to be dispensed as such, it may conveniently be filled into suitable containers or ampoules, each containing about five grams of the solution and therefore containing the equivalent of one gram of silver picrate. The solution thus dispensed may be conveniently employed for the preparation in the cold of fresh and active aqueous solutions containing up to 1% of silver picrate, at the convenience and according to the desires of the dispenser.

The method hereinbefore described may be conveniently employed as a step in the production of silver picrate in solid or crystalline form. For such purpose, the proportions of the monalkyl ether solvent are preferably controlled so that a more concentrated solution is obtained, between 20 and 50%. After this solution has been filtered, the silver picrate may be caused to crystallize out by the addition of water. Thus with the more concentrated solutions of silver picrate in the monoethyl ether, on the addition of water, preferably up to about twice the amount in volume of the picrate solutions, the silver picrate rapidly crystallizes out in shining golden yellow needles. These crystals are filtered off or drained from excess solvent, washed with ice water and dried. More dilute solutions of the silver picrate may be employed, if desired, but in general the more concentrated solutions are preferred when solid silver picrate is to be prepared, as the proportionate yields are thereby increased.

The solutions of silver picrate in a diethylene glycol monoalkyl ether, and particularly the monoethyl ether, may be employed in the preparation of other compounds of picric acid, such as other metal picrates or ethers of picric acid. This may be effected by causing the silver picrate, in the diethylene glycol monoalkyl ether solution to react upon a metal halide or an organic halide such as the simple hydrocarbon halides having alkyl, aryl, alkaryl and cyclic radicals.

For example, mercuric chloride or calcium chloride may be dissolved in diethylene glycol monoethyl ether and the solution added to a solution of silver picrate in the same ether, equivalent proportions of the reacting compounds being provided. Silver chloride is precipitated, leaving in solution the mercuric or calcium picrates, which may be employed in solution or recovered as desired in the solid state.

Similarly, by using solutions of organic halides, and particularly of hydrocarbon halides, for example, the alkyl halides such as methyl chloride, ethyl chloride and the higher alkyl chlorides, such as amyl chloride, hexylchloride and the like; the aralkyl halides, such as benzyl and phenylethyl chlorides; aryl halide, such as phenyl, tolyl and naphthyl chlorides, and cyclohexyl chloride in the lower monoalkyl ethers of diethylene glycol, particularly the monomethyl and monoethyl ethers, and adding them to a solution of silver picrate in equivalent proportions, the corresponding picryl ethers are produced. By using dihalides in a similar manner the di-compounds may be formed.

Although the chlorides have been referred to hereinbefore as examples of the metal and organic halides that may be employed, it will be understood that other halides, such as the bromides and iodides may be employed with similar results.

As in the case of the preparation of the metal picrates, the organic picrates may be separated by judiciously adding water to the reacted diethylene glycol monoalkyl ether solution. When the latter becomes turbid, the picrate generally crystallizes out on standing. Other means of separating out the picrate may be employed, if desired.

I claim:

1. The method of preparing alkyl picrates which comprises reacting upon silver picrate in solution in diethylene glycol monoethyl ether with glycol with an alkyl halide.

2. The method of preparing alkyl picrates which comprises reacting upon silver picrate in solution in diethylene glycol monoethyl ether with an alkyl halide.

3. The method of preparing aryl picrates which comprises reacting upon silver picrate in solution in a lower monoalkyl ether of diethylene glycol with an aryl halide.

4. The method of preparing aryl picrates which comprises reacting upon silver picrate in solution in diethylene glycol monoethyl ether with an aryl halide.

5. The method of preparing phenyl picrate which comprises reacting upon silver picrate in solution in a monoalkyl ether of diethylene glycol with phenyl chloride.

6. The method of preparing aralkyl picrates which comprises reacting upon silver picrate in solution in a lower monoalkyl ether of diethylene glycol with an aralkyl halide.

7. The method of preparing aralkyl picrates which comprises reacting upon silver picrate in solution in diethylene glycol monoethyl ether with an aralkyl halide.

8. The method of preparing benzyl picrate which comprises reacting upon silver picrate in solution in a monoalkyl ether of diethylene glycol with benzyl chloride.

9. The method of preparing hydrocarbon picrates which comprises reacting silver picrate in solution in a lower monoalkyl ether of diethylene glycol with a hydrocarbon halide.

10. The method of prepared hydrocarbon picrates which comprises reacting silver picrate in solution in diethylene glycol monoethyl ether with a hydrocarbon halide.

JOHN C. BIRD.